March 24, 1970     R. L. FERRELL     3,501,978
DIFFERENTIAL DRIVE MECHANISM
Filed July 10, 1967     2 Sheets-Sheet 1
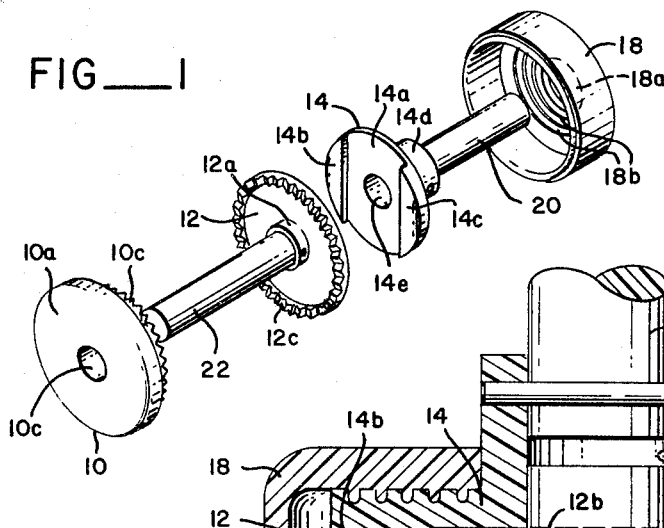
FIG__1
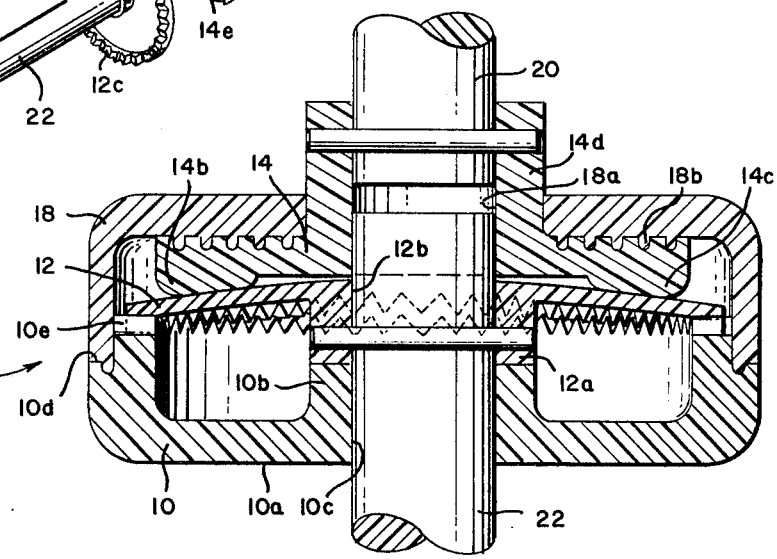
FIG__2
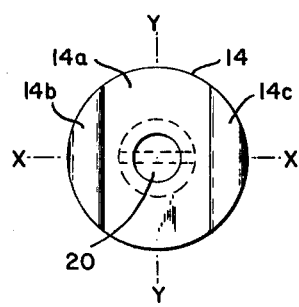
FIG__3
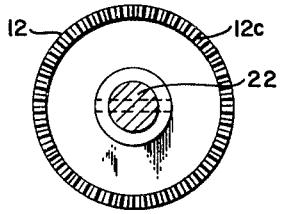
FIG__4
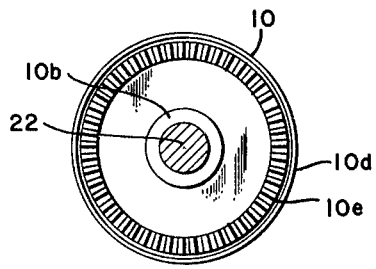
FIG__5
ROBERT L. FERRELL
*INVENTOR.*
BY
*ATTORNEYS*

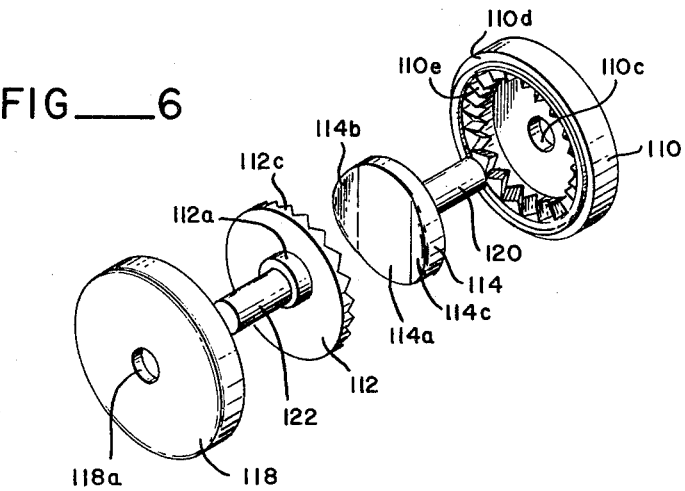
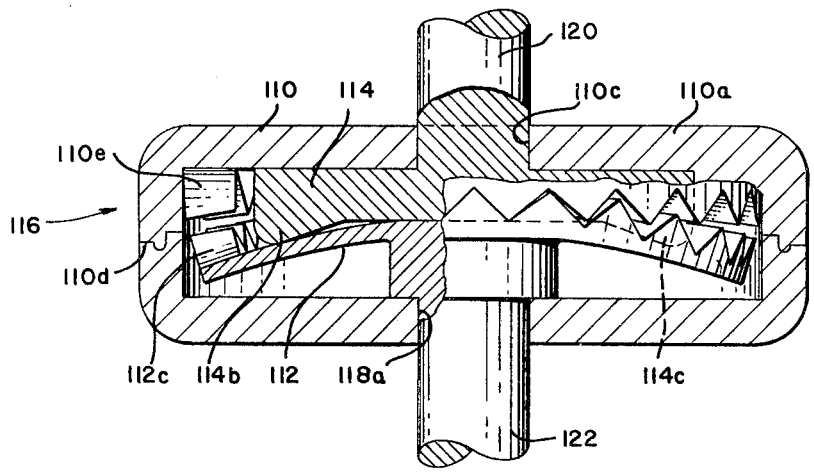
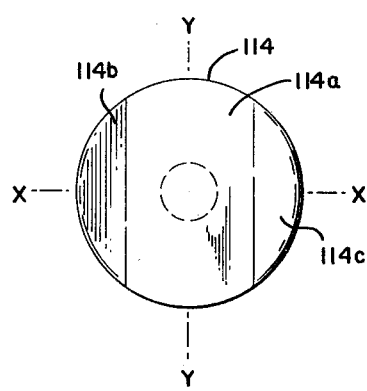

United States Patent Office 3,501,978
Patented Mar. 24, 1970

3,501,978
DIFFERENTIAL DRIVE MECHANISM
Robert L. Ferrell, Bothell, Wash., assignor to Digilog Electronics Corporation, Seattle, Wash., a corporation of Washington
Filed July 10, 1967, Ser. No. 652,144
Int. Cl. F16h 35/00
U.S. Cl. 74—640                                7 Claims

ABSTRACT OF THE DISCLOSURE

Two crown gears, having different numbers of gear teeth, are juxtapositioned for interengagement of their respective gear teeth. A rotatable member bears against one of the crown gears to effect sequential interengagement and dis-interengagement of the gear teeth. One crown gear may be flexible and deflected by a rotatable cam to effect interengagement and dis-interengagement of the gear teeth.

---

In the drawings:

FIG. 1 depicts one embodiment of this invention with the components in axial alignment preparatory to being assembled;

FIG. 2 is a cross section of the assembled components of the FIG. 1 embodiment;

FIG. 3 is a bottom plan view of the cam plate component of the FIGS. 1–2 embodiment;

FIG. 4 is a bottom plan view of the flexible crown gear component of the FIGS. 1–2 embodiment;

FIG. 5 is a top plan view of the stationary crown gear component of the FIGS. 1–2 embodiment;

FIG. 6 depicts another embodiment of this invention with the components in axial alignment preparatory to being assembled;

FIG. 7 is a cross section of the assembled components of the FIG. 6 embodiment; and FIG. 8 is a bottom plan view of the cam plate component of the FIGS. 6–7 embodiment.

This invention relates to differential drives of the type wherein two relatively rotatable gear means, with different numbers of gear teeth, are juxtapositioned such that means may be applied to one gear means to effect interengagement of only certain of their respective teeth, and such applied means being rotatable to sequentially effect the interengagement and dis-interengagement of all the respective gear teeth. By reason of the different numbers of teeth, there will result a relative rotation between the two gear means as the applied means is itself rotated. Thus, by applying rotative input power to the applied means, a rotative output—having a different rate of rotation than the input—can be taken off from either of the two gear means.

More particularly, this invention is directed to differential drives wherein the aforementioned gear means comprise coaxial crown gears with opposing gear teeth, a crown gear by definition having gear teeth directed generally longitudinally of the gear's axis of rotation vis-a-vis having gear teeth directed generally radially of the gear's axis of rotation. Usually, the direction of the crown gear teeth would be parallel to the axis of rotation but it may be slightly nonparallel so long as the respective gear teeth may be drivingly interengaged with the crown gears coaxially aligned with the interengaging portions of the respective crown gear teeth being nonconcentric relative to the axis of rotation. In the preferred embodiments described hereinafter, one crown gear is stationary and the other crown gear is rotatable relative thereto. One crown gear is preferably flexible such that only certain of its gear teeth may be deflected into interengagement with the teeth of the nonflexible, or rigid, crown gear. The aforementioned applied means is provided with at least one cam lobe designed to rotatably bear against and deflect the flexible crown gear to effect the sequential interengagement and disengagement of the respective gear teeth. In the preferred embodiments described hereinafter, the flexible crown gear is rotatable and adapted to function as the power output transmitter of the differential drive.

In the operation of this crown gear type of differential drive, rotation of the applied means will cause the teeth of the flexible crown gear to sequentially pass into and out of mesh with the gear teeth of the rigid crown gear. And by reason of the different number of teeth as respects the two crown gears and by reason of one crown gear being rotatable relative to the other crown gear, the respective gear teeth will first clash as they move into interengagement and then—by rotation of the rotatable crown gear relative to the stationary crown gear—move into interengaging mesh. By so doing, the desired relative movement between the crown gears will be effected. If the rotatable crown gear has a greater number of teeth than the stationary crown gear, the rotatable crown gear will rotate in the same direction as the power means interconnected to the applied means. If the rotatable crown gear has a lesser number of teeth than the stationary crown gear, the rotatable crown gear will rotate in the opposite direction.

The rotatable crown gear will rotate at a reduced rate relative to the rotation of the power input means interconnected to the applied means, such reduced rate being inversely proportional to the ratio of the number of teeth of the rotatable crown gear to the difference in the number of teeth of the two crown gears. For example, if the rotatable crown gear has 50 teeth and the stationary crown gear has 48 teeth, a difference of 2 teeth, the rotatable crown gear will rotate at a rate of $\frac{2}{50}$, or $\frac{1}{25}$, of the rate of rotation of the power input means.

The differential drive of this invention, although not limited thereto, is particularly suited for control of electronic devices such as variable capacitors and potentiometers where fine adjustment over a narrow range must be attainable by rotation of a control shaft. The drive of this invention can be constructed in very small sizes to suit microelectronic devices.

The differential drive of FIGS. 1–5 comprises a stationary rigid crown gear 10, a rotatable flexible crown gear 12, and a means 14 bearing against and deflecting the flexible crown gear. The stationary crown gear 10 also comprises the lower half of a housing 16 which, in combination with the upper half 18 of the housing, defines a confined interior that permits the means 14 to bear against the flexible crown gear 12 to the extent necessary to effect the necessary deflection of the flexible crown gear 12.

Stationary crown gear 10 comprises a generally cylindrical member with a closed outer end 10a, an inwardly-extending and centered protuberance 10b formed in the outer end 10a providing an axial opening 10c into the housing interior. The sidewall is provided exteriorly with a peripheral seating ledge 10d for the housing top half 18, and is provided interiorly with an annular ring of gear teeth 10e whose teeth project upwardly parallel with the axis of crown gear 10 and have plano pitch surfaces.

Rotatable and flexible crown gear 12 comprises a thin flexible disk-like member with a downwardly-extending and centered cylindrical protuberance 12a adapted to seat on the protuberance 10b and providing an axial opening 12b coaxial with and of equal diameter as opening 10c. The outer peripheral edge of the member is provided with an annular ring of gear teeth 12c whose teeth project downwardly parallel with the axis of crown gear 12 and have plano pitch surfaces. The diameter of the ring of gear teeth 12c relative to the diameter of the ring of gear teeth 10e is such that the respective teeth are in interengageable juxtaposition. Due to the height of the two protuberances 10b and 12a, the ring of gear teeth 12c, with the crown gear 12 in an unflexed condition, will not be interengaged.

The means 14 comprises a circular cam plate 14a, two diametrically-opposed and downwardly-protruding sector cam lobes 14b–14c formed in the bottom surface of plate 14a, and a centered upwardly-extending cylindrical protuberance 14d formed in the upper surface of plate 14a and providing an axial opening 14e coaxial with and of equal diameter as openings 10c and 12b. The cam surfaces of cam lobes 14b–14c are upwardly sloped uniformly inward with the chordal edges of the lobes being thinnest.

The upper half 18 of the housing is provided with an axial opening 18a therethrough that encloses the protuberance 14d, and with concentric annular ridges 18b that extend interiorly downwardly and mesh with the concentric annular grooves in the upper surface of cam plate 14a to provide a hermetic seal. When the two halves of the housing are mated, the interior longitudinal dimension is such that the cam lobes 14b–14c are forced against flexible crown gear 12 to effect complete interengagement of the respective crown gear teeth at diametrically opposite points below points x—x on the cam lobes (see FIG. 3). Because of the design of the cam lobes, the respective teeth are progressively interengaged to a lesser and lesser extent progressing away from the points x—x until there is complete dis-interengagement at least at diametrically opposite points below y—y on the cam lobes (see FIG. 3).

A power input shaft 20 extends into opening 18a and is pinned to the protuberance 14d of means 14 for rotating the cam lobes 14b–14c about the upper surface of the flexible crown gear 12. A power output shaft 22 extends through openings 10c and 12b and into opening 18a and is pinned to protuberance 12a for rotation with the flexible crown gear 12.

The differential drive of FIGS. 6–8 comprises a stationary crown gear 110, a rotatable flexible crown gear 112, and a means 114 bearing against and deflecting the flexible crown gear. The stationary crown gear also comprises the upper half of a housing 116 which, in combination with the lower half 118 of the housing, defines a confined interior that permits the means 114 to bear against the flexible crown gear 112 to the extent necessary to effect the necessary deflection of the flexible crown gear 112.

Stationary crown gear 110 comprises a generally cylindrical member with a closed outer end 110a provided with an axial opening 110c into the housing interior. The sidewall is provided exteriorly with a peripheral seating ledge 110d for the housing lower half 118, and is provided interiorly with an annular ring of gear teeth 110e whose teeth project downwardly parallel with the axis of crown gear 110 and have plano pitch surfaces.

Rotatable and flexible crown gear 112 comprises a thin, flexible disk-like member with a downwardly-extending and centered cylindrical protuberance 112a adapted to seat on the inner surface of the housing lower half end. The outer peripheral edge of the member is provided with an annular ring of gear teeth 112c whose teeth project upwardly parallel with the axis of crown gear 112 and have plano pitch surfaces. The diameter of the ring of gear teeth 112c relative to the diameter of the ring of gear teeth 110e is such that the respective teeth are in interengageable juxtaposition. Due to the interior width of the housing and the height of protuberance 112a, the ring of gear teeth 112c, with the crown gear 112 in an unflexed condition, will be interengaged.

The means 114 comprises a circular cam plate 114a, and two diametrically-opposed and downwardly-protruding sector cam lobes 114b–114c formed in the bottom surface of plate 114a. The cam surfaces of cam lobes 114b–114c are upwardly sloped uniformly inward with the chordal edges of the lobes being thinnest.

When the two halves of the housing are mated, the interior longitudinal dimension is such that the cam lobes 114b–114c are forced against flexible crown gear 112 to effect complete dis-interengagement of the respective crown gear teeth at diametrically opposite points adjacent points x—x on the cam lobes (see FIG. 8). Because of the design of the cam lobes, the respective teeth are progressively interengaged to a greater and greater extent progressing away from the points x—x until there is complete interengagement at a diametrically opposite point adjacent points y—y on the cam lobes (see FIG. 8).

A power input shaft 120 extends into axial opening 110c and in interconnected to cam plate 114a for rotating the cam lobes 114b–114c about the upper surface of the flexible crown gear 112. A power output shaft 122 extends through axial opening 118a and is interconnected to the protuberance 112a for rotation with the flexible crown gear 112.

The two differential drive embodiments disclosed hereinabove are particularly suited for usage with microelectronic components. The overall diameter can be kept within reasonable limits because the gears are not concentric. The overall thickness also can be kept within reasonable limits because one of the crown gears is laterally deflectable in a direction parallel to the axis of rotation. If desired, furthermore, an electronic component could be contained within the housing, in which case no output shaft need extend out of the housing.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A differential drive which comprises a first rotatable and flexible crown gear; a second stationary crown gear coaxial with said first crown gear and having a different number of teeth therefrom, the teeth of the two gears adapted to be interengaged; a housing containing the two gears; a cam plate interposed coaxially between the two gears and having diametrically-opposed cam lobes that contact and bear against said first crown gear to deflect said first crown gear such that certain of the teeth of said first crown gear are interengaged with the teeth of said second crown gear and such that other teeth of said first crown gear are not interengaged with the teeth of said second crown gear; power input means for rotating said cam plate to sequentially interengage the teeth of said first crown gear with the teeth of said second crown gear whereby rotation of said first crown gear is effected.

2. A differential drive according to claim 1 wherein said cam lobes deflect said first crown gear so as to urge the teeth thereof out of interengagement adjacent the lobes.

3. A differential drive which comprises first and second coaxial crown gears having different numbers of teeth, the teeth of the two gears adapted to be disengaged; rotatable means contacting said first crown gear such that certain of the teeth of said first crown gear are interengaged with the teeth of said second crown gear and such that other teeth of said first crown gear are not interengaged with the teeth of said second crown gear, power input means for rotating said rotatable means to sequentially interengage the teeth of said first crown gear with the teeth of said second crown gear whereby relative rotation between said first and second crown gears is effected; said first crown gear being flexible and positioned relative to said second crown gear such that said rotatable means must contact and deflect said first crown gear to effect disinterengagement of the respective gear teeth.

4. A differential drive which comprises first rotatable and flexible and second stationary coaxial crown gears having different numbers of teeth, the teeth of the two gears adapted to be interengaged; rotatable means contacting and deflecting said first crown gear such that certain of the teeth of said first crown gear are interengaged with the teeth of said second crown gear; power input means for rotating said rotatable means to sequentially interengage the teeth of said first crown gear with the teeth of said second crown gear whereby rotation of said first crown gear is effected; the first crown gear being positioned relative to said second crown gear such that said rotatable means must contact and deflect said first crown gear to effect dis-interengagement of the respective gear teeth.

5. A differential drive which comprises a housing having an inner annular portion provided as a stationary crown gear, and a second crown gear member rotatably mounted within said housing, the two crown gears having different numbers of teeth with the teeth of the two crown gears adapted to be interengaged; rotatable means contacting and deflecting the second crown gear member such that certain of the teeth of said second crown gear member are interengaged with the teeth of said stationary crown gear, said rotatable means comprising a circular plate having a shaft extension extending through said housing and provided on an inner side with at least one cam lobe adapted to contact said second crown gear member and provided on the opposite outer side with a plurality of alternating circular grooves meshed in corresponding alternating ribs and grooves provided on an adjacent inner surface of said housing, the meshed ribs and grooves encircling the shaft extension and housing opening through which the shaft extension protrudes; and power input means engaged to said rotatable means to effect sequential engagement of the teeth of said second crown gear member with the teeth of said stationary crown gear to rotate said second crown gear.

6. The differential drive of claim 5 wherein said second crown gear is flexible and mounted so as to require flexure to produce engagement with said stationary crown gear; and wherein said cam lobe is formed as a segment at the outer edge of said circular plate and is provided with a sloped crown gear-contacting surface so as to effect progressive flexure of said second crown gear to a maximum at the midpoint of the arcuate cam lobe edge.

7. A differential drive which comprises a housing, a stationary crown gear mounted within said housing, and a second crown gear member rotatably mounted within said housing, the two crown gears having different numbers of teeth with the teeth of the two crown gears adapted to be interengaged; rotatable means contacting and deflecting the second crown gear member such that certain of the teeth of said second crown gear member are interengaged with the teeth of said stationary crown gear, said rotatable means comprising a circular plate provided on an inner side with at least one cam lobe formed as a segment with a sloped crown gear contacting surface having a substantial chordal width such that the arcuate peripheral edge of said cam lobe will have sufficient length to span a substantial number of crown gear teeth so as to effect a controlled and progressive flexure of said second crown gear to a maximum at the midpoint of the arcuate cam lobe edge, said housing being provided in two axial sections with the interior axial length of the housing being matched with the axial thicknesses of the two crown gears and the circular plate so that assembly of these components into the housing and closure of the housing will result in the outer surface of said circular plate abutting the adjacent housing surface so as to force said flexure in said second crown gear member; and the area of contact between said cam lobe and said second crown gear being radially inward of the teeth of said second crown gear so as to enable said second crown gear to deflect out of engagement with said stationary crown gear during rotation of said circular plate in the event that relative rotation between the two crown gears is prevented, the abutment of said circular plate against the adjacent housing surface preventing deflection of said cam lobe.

References Cited

UNITED STATES PATENTS

| | | | |
|---|---|---|---|
| 2,849,897 | 9/1958 | Walma | 74—800 X |
| 3,178,963 | 4/1965 | Musser | 74—640 |
| 3,187,605 | 6/1965 | Stiff | 74—640 |
| 3,206,703 | 9/1965 | Ferrell | 74—640 X |
| 3,363,484 | 1/1968 | Slaughter | 74—640 X |

FOREIGN PATENTS 249,805  10/1926  Great Britain.

DONLEY J. STOCKING, Primary Examiner

T. C. PERRY, Assistant Examiner

U.S. Cl. X.R.

74—800